United States Patent
Máynez et al.

(10) Patent No.: US 9,427,859 B2
(45) Date of Patent: Aug. 30, 2016

(54) MOTOR SYSTEM FOR DUAL VOLTAGE DEVICES

(71) Applicant: Techtronic Outdoor Products Technology Limited, Hamilton HM12 (BM)

(72) Inventors: Rafael Máynez, Anderson, SC (US); G. Michael Hornick, Anderson, SC (US); Gerald Satterfield, Pickens, SC (US); Matthew H. Malone, Sr., Anderson, SC (US); John W. Olson, Simpsonville, SC (US)

(73) Assignee: TECHTRNOIC OUTDOOR PRODUCTS TECHNOLOGY LIMITED, Hamilton (BM)

( * ) Notice: Subject to any disclaimer, the term of this patent is extended or adjusted under 35 U.S.C. 154(b) by 485 days.

(21) Appl. No.: 13/736,415

(22) Filed: Jan. 8, 2013

(65) Prior Publication Data

US 2014/0190017 A1 Jul. 10, 2014

(51) Int. Cl.
*A01D 34/416* (2006.01)
*B25F 5/00* (2006.01)
*H02K 23/00* (2006.01)

(52) U.S. Cl.
CPC .............. *B25F 5/001* (2013.01); *A01D 34/416* (2013.01); *B25F 5/00* (2013.01); *H02K 23/00* (2013.01)

(58) Field of Classification Search
CPC ......... H02K 23/00; B25F 5/00; B25F 5/001; A01D 34/416
USPC ........................ 30/208–220; 310/47, 50, 136
See application file for complete search history.

(56) References Cited

U.S. PATENT DOCUMENTS

| | | | |
|---|---|---|---|
| 1,942,295 A | 1/1934 | Kerr, Jr. et al. | |
| 2,433,390 A | 12/1947 | Packer | |
| 2,852,706 A * | 9/1958 | Combs | 307/150 |
| 3,525,912 A * | 8/1970 | Wallin | A47J 43/082 307/28 |
| 3,943,423 A | 3/1976 | Hoffman | |
| 4,152,882 A * | 5/1979 | Howard | 56/13.7 |
| 4,333,302 A | 6/1982 | Thomas et al. | |
| 4,835,409 A | 5/1989 | Bhagwat et al. | |
| 4,835,410 A | 5/1989 | Bhagwat et al. | |
| 5,160,879 A * | 11/1992 | Tortola et al. | 320/111 |
| 5,301,494 A * | 4/1994 | Peot et al. | 56/10.5 |
| 5,476,293 A | 12/1995 | Yang | |
| 5,624,347 A | 4/1997 | Yang | |

(Continued)

FOREIGN PATENT DOCUMENTS

JP  2005096023 A  4/2005

*Primary Examiner* — Ghassem Alie
*Assistant Examiner* — Nhat Chieu Do
(74) *Attorney, Agent, or Firm* — Michael Best & Friedrich LLP

(57) ABSTRACT

A power tool includes a housing, an output shaft supported by the housing for rotation about an axis, a battery terminal selectively operable to receive a DC power supply from a battery, and a receptacle selectively operable to receive an AC power supply from an AC power source. The power tool further includes a motor operable in a first power mode, in response to receipt of the DC power supply, to rotatably drive the output shaft, and also operable in a second power mode, in response to receipt of the AC power supply, to rotatably drive the output shaft. The power tool also includes a mechanical interlock movable between a first position in which the interlock inhibits the flow of the AC power supply to the motor and a second position in which the interlock inhibits the flow of the DC power supply to the motor.

14 Claims, 11 Drawing Sheets

(56) References Cited

U.S. PATENT DOCUMENTS

| | | |
|---|---|---|
| 6,172,437 B1 | 1/2001 | Du |
| 6,558,090 B2 | 5/2003 | Lagaly et al. |
| 6,566,843 B2 | 5/2003 | Takano et al. |
| 6,683,396 B2 | 1/2004 | Ishida et al. |
| 7,196,911 B2 | 3/2007 | Takano et al. |
| 7,482,768 B2 | 1/2009 | Lucas et al. |
| 7,653,963 B2 | 2/2010 | Cochran et al. |
| 7,712,182 B2 | 5/2010 | Zeiler et al. |
| 7,728,534 B2 | 6/2010 | Lucas et al. |
| 7,884,560 B2 | 2/2011 | Lucas et al. |
| 7,893,586 B2 | 2/2011 | West et al. |
| 8,076,873 B1 * | 12/2011 | Lucas et al. .................. 318/107 |
| 2002/0121000 A1 | 9/2002 | Tyler |
| 2003/0102844 A1 | 6/2003 | Bailey |
| 2005/0206344 A1 | 9/2005 | Grant, Sr. |
| 2008/0284363 A1 * | 11/2008 | Lucas et al. .................. 318/441 |

* cited by examiner

MOTOR SYSTEM FOR DUAL VOLTAGE DEVICES

BACKGROUND

The invention relates to power tools, and more particularly to dual-voltage power tools. It is often desirable for power tools, small appliances, and other devices that include an electric motor to have the option to operate either with a battery or connected to an electrical outlet. These "corded/cordless" products are attractive because they do not have the limitations of a single power source. A corded tool for example, is not portable and cannot be used in places where electrical outlets are not available. On the other hand, a cordless tool has a limited runtime and may have lower performance than a corded device.

SUMMARY

The invention provides, in one aspect, a power tool including a housing and an output shaft supported by the housing for rotation about an axis. The power tool further includes a first motor disposed in the housing and a second motor disposed in the housing and coupled to the first motor. The first motor drives the output shaft and does not drive the second motor when in a first power mode, and the second motor drives the first motor and the output shaft when in a second power mode.

The invention also provides, in another aspect, a power tool including a housing and a tool element supported by the housing for rotation about an axis. The power tool also includes a first motor rotationally coupled to the tool element and operable in response to a DC power supply to rotate the tool element. A second motor is selectively rotationally coupled to the first motor and the tool element and operable in response to an AC power supply to rotate the first motor and the tool element. The power tool further includes a coupling mechanism disposed between the second motor and the first motor. The coupling mechanism is operable in a first mode to decouple the rotation of the first motor and the second motor when DC power is supplied to the first motor, and operable in a second mode to couple the rotation of the first motor and the second motor when AC power is supplied to the second motor.

The invention further provides, in another aspect, a power tool including a housing and an output shaft supported by the housing for rotation about an axis. The power tool also includes a battery terminal selectively operable to receive a DC power supply from a battery and a receptacle selectively operable to receive an AC power supply from an AC power source. The power tool further includes a motor. The motor is operable in a first power mode, in response to receipt of the DC power supply, to rotatably drive the output shaft. The motor is also operable in a second power mode, in response to receipt of the AC power supply, to rotatably drive the output shaft. The power tool also includes a mechanical interlock movable between a first position in which the interlock inhibits the flow of the AC power supply to the motor and a second position in which the interlock inhibits the flow of the DC power supply to the motor.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
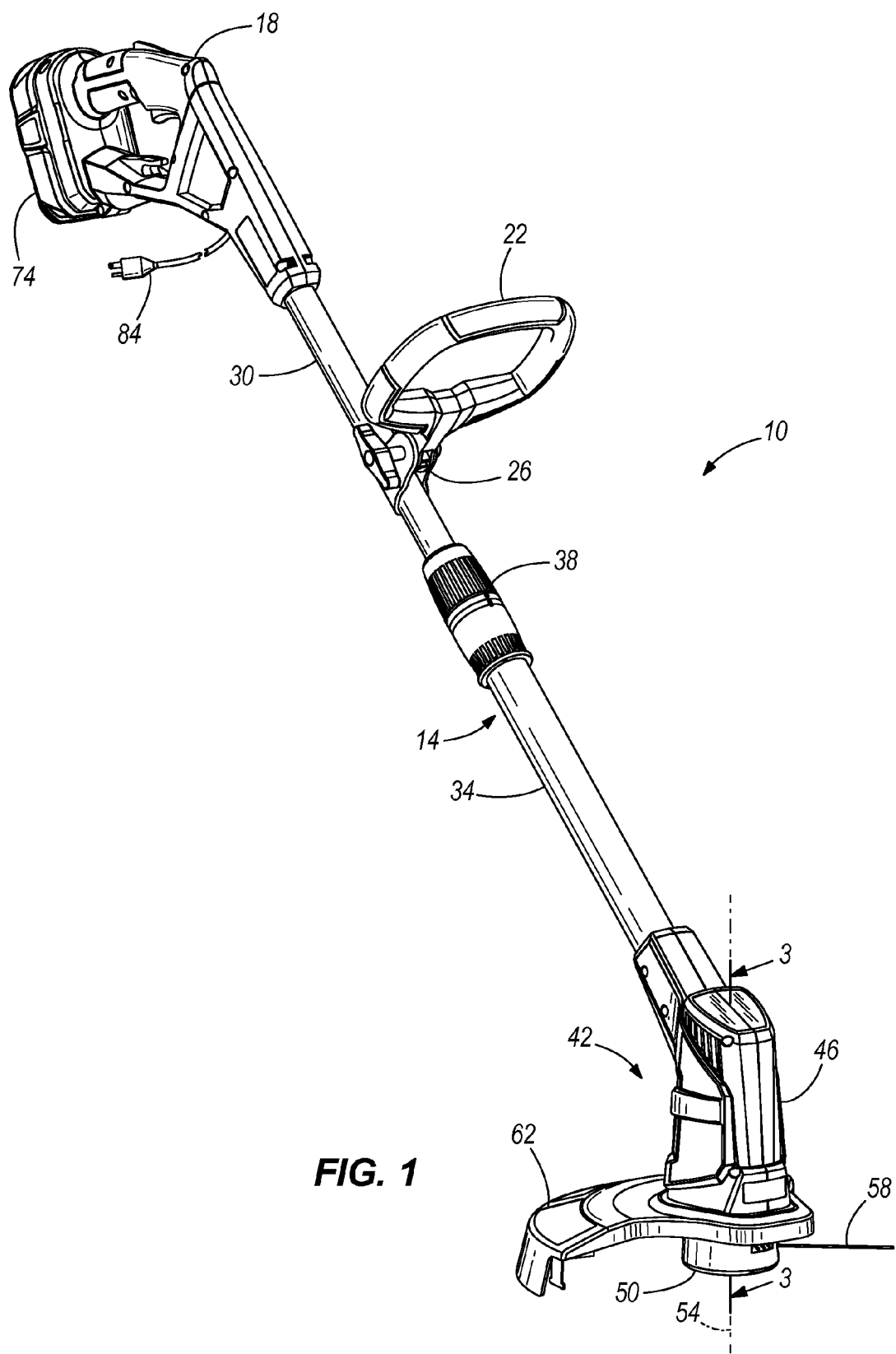
FIG. 1 is a perspective view of a string trimmer according to one embodiment of the invention.

FIG. 1 illustrates a power tool according to an embodiment of the invention. As shown in the drawings for the purposes of illustration, the invention is embodied in a string trimmer 10; however, the features of the invention described herein are equally applicable to other types of power tools and electric appliances.

The string trimmer 10 includes a shaft 14 having a rear handle 18 at its upper end and a forward handle 22 spaced from the rear handle 18 to facilitate two-handed operation of the string trimmer 10. The forward handle 22 includes a flange 26 operable to permit adjustment of the position of the forward handle 22 on the shaft 14 and/or the orientation of the forward handle 22 relative to the shaft 14. In other embodiments, the forward handle 22 may be fixed to the shaft 14 or integrally formed as a part of the shaft 14.

With continued reference to FIG. 1, the shaft 14 comprises an upper tube 30 and a lower tube 34 in a telescoping arrangement. A locking mechanism 38 is disposed on an intermediate portion of the shaft 14, circumscribing the interface between the upper and lower tubes 30, 34. The locking mechanism 38 is rotatable in a first direction to permit telescopic movement of the upper tube 30 and the lower tube 34, thereby permitting extension or contraction of the shaft 14. The locking mechanism 38 is rotatable in an opposite direction to inhibit telescopic movement of the upper tube 30 and the lower tube 34, thereby locking the shaft 14 at a particular length. In the illustrated embodiment, the locking mechanism 38 is configured as a collar; however, the locking mechanism 38 may take any form, such as a cam lever or a notch and detent system. Alternatively, the shaft 14 may be formed as a single piece and may not be adjustable.

At its lower end, the string trimmer 10 includes a head portion 42 that includes a housing 46 and a string hub 50 disposed on the underside of the housing and defining an axis 54 (FIG. 1). The string hub 50 may include an internal bobbin or spool (not shown) and may be configured for bump-feed, fixed line, or automatic-feed operation. Alternatively, the string hub 50 may have any other suitable configuration. A length of flexible line extends radially outward from the string hub 50 to form a cutting element 58. A cowl 62 partially surrounds a lower periphery of the housing 46 to shield an operator of the string trimmer 10 from the cutting element 58 and any debris produced during operation.

Figure 2:
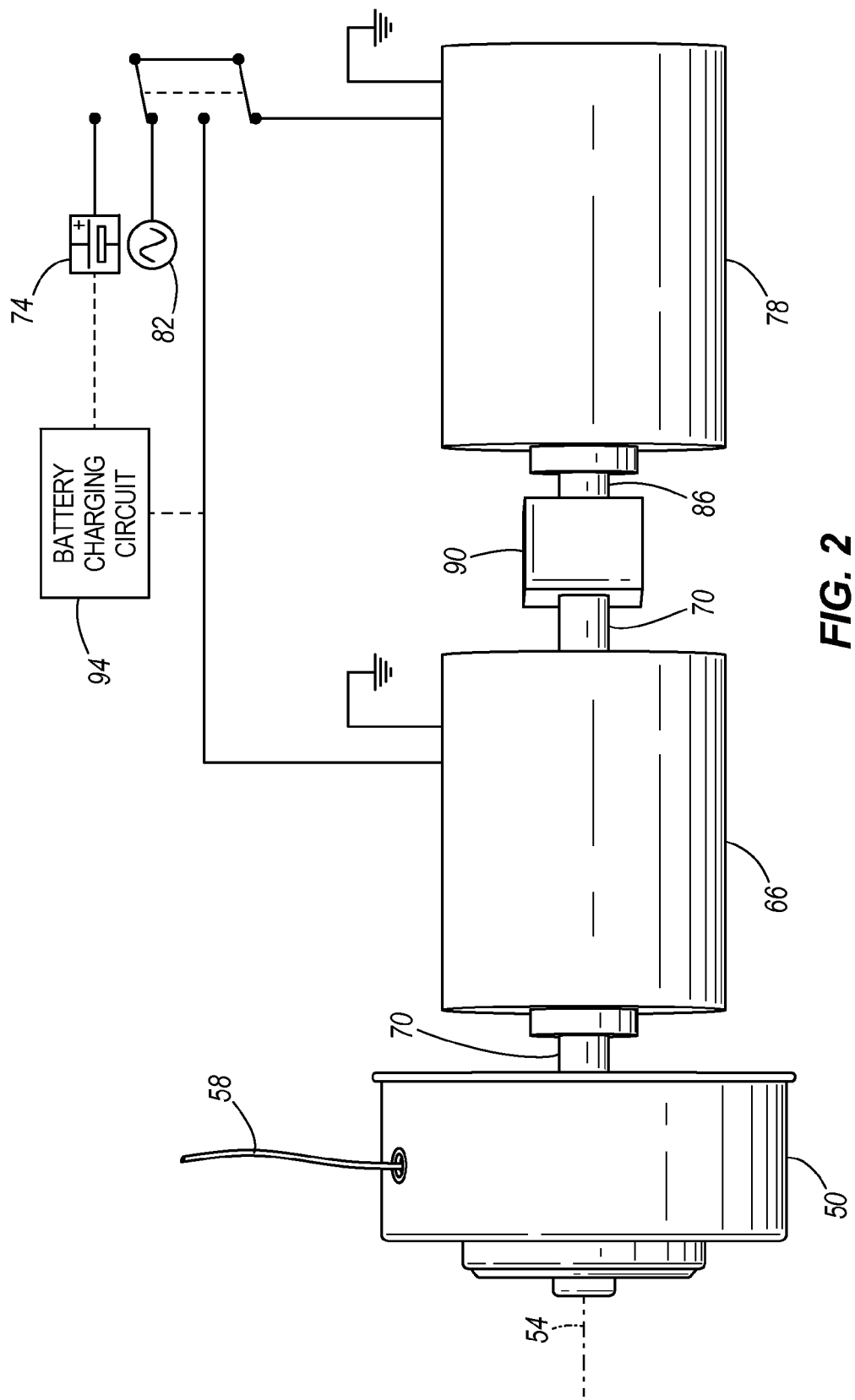
FIG. 2 is a schematic wiring diagram for the string trimmer of FIG. 1.
Figure 3:
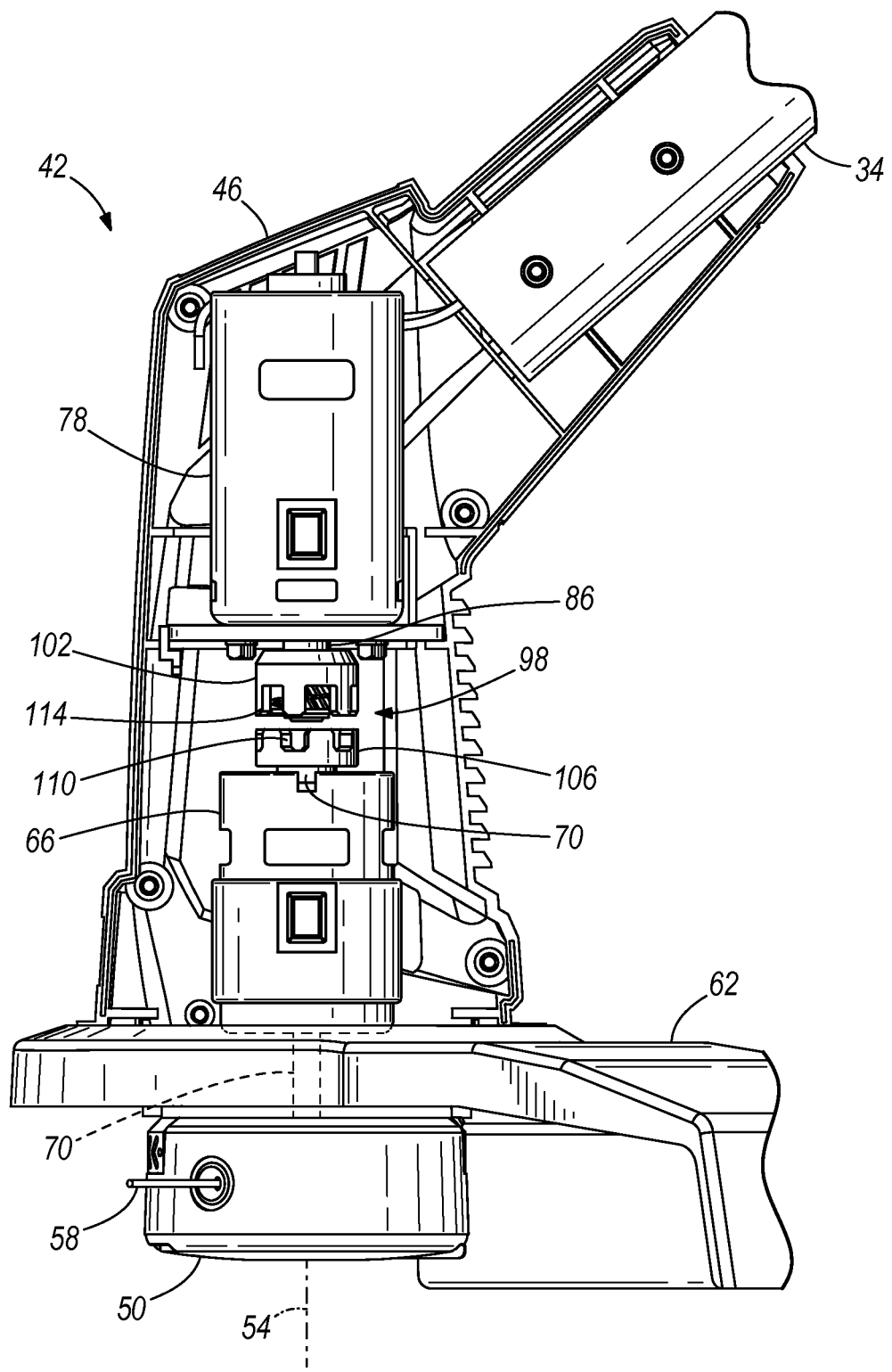
FIG. 3 is a partial, cross-sectional view taken along line 3-3 of FIG. 1, with a clutch mechanism of the string trimmer shown in a disengaged position.

With reference to FIGS. 2 and 3, the head portion 42 includes a first motor 66 supported by the housing 46 and aligned with the axis 54 of the string hub 50. The first motor 66 has an output shaft 70 that extends through both ends of the motor 66 and that is coupled to the string hub 50 to transmit torque to the string hub 50 (FIG. 3). In the illustrated embodiment, the first motor 66 is a direct current (DC) motor, such as a brushed or brushless permanent-magnet DC motor. The first motor 66 is configured to receive power from a rechargeable battery 74 (e.g., lithium-ion, nickel-metal hydride, nickel-cadmium, etc.) (FIG. 2). The head portion 42 also includes a second motor 78 supported by the housing 46 and arranged coaxially with the first motor 66. Alternatively, the second motor 78 may be offset from the first motor 66 and/or oriented at an angle relative to the axis 54. In addition, some constructions may include one or both of the first motor 66 and the second motor 78 that is arranged in an offset position with respect to the axis 54 or that are arranged at an oblique angle with respect to the axis 54. In the illustrated embodiment, the second motor 78 is an alternating current (AC) motor, such as a universal AC motor or an AC induction motor. The second motor 78 is configured to receive power from a high-voltage, AC power source 82, such as a conventional wall outlet. In other embodiments, the second motor 78 may be a DC motor and the string trimmer 10 may include a rectifier circuit (not shown) to convert AC power from the high-voltage power source 82 to DC power usable by the second motor 78.

The second motor 78 includes an output shaft 86 selectively coupled for rotation to the output shaft 70 of the first motor 66 via a coupling member 90. The coupling member 90 may be any structure operable to selectively couple the output shaft 86 of the second motor 78 to the output shaft 70 of the first motor 66, such as a friction clutch, a centrifugal clutch, a roller clutch, and the like. Specific embodiments of the coupling member 90 are described in detail herein.

With reference to FIG. 2, the string trimmer 10 is capable of operating in a first power mode (i.e., a cordless mode) in which the first motor 66 draws power from the battery 74. In the first power mode, the coupling member 90 permits relative rotation between the output shaft 70 of the first motor 66 and the output shaft 86 of the second motor 78, decoupling the first motor 66 from any rotational drag associated with the second motor 78. Accordingly, in the first power mode, the first motor 66 need only produce enough torque to drive the string hub 50 at a suitable working speed.

With continued reference to FIG. 2, the string trimmer 10 is also capable of operating in a second power mode (i.e., a corded mode) in which the second motor 78 draws power from the AC power source 82 through a power cable 84. In the second power mode, the coupling member 90 couples the output shaft 86 of the second motor 78 with the output shaft 70 of the first motor 66 for rotation. The second motor 78 drives the string hub 50 through the first motor 66. Accordingly, to overcome the added rotational drag of the first motor 66, the second motor 78 must produce more torque than the first motor 66 produces in the first power mode in order to drive the string hub 50 at the suitable working speed.

In the illustrated embodiment, the string trimmer 10 includes a battery charging circuit 94 operable to recharge the battery 74 when the string trimmer 10 is operated in the second power mode (FIG. 2). Because the output shaft 70 of the first motor 66 is rotated by the second motor 78 in the second power mode, the first motor 66 may act as a DC power supply (i.e., a generator) to supply a charging current to the battery 74. In other embodiments, the first motor 66 may not act as a DC power supply, and a rectifier circuit (not shown) may be included to recharge the battery 74 directly from the AC power supply 82. In still other embodiments, the string trimmer 10 may not include any battery charging circuitry 94, and the battery 72 may be recharged using an external charging apparatus (not shown).

Specific embodiments of the coupling member 90 will now be described. In the embodiment illustrated in FIGS. 3-5, the coupling member 90 takes the form of a clutch mechanism 98 including a driving member 102 and a driven member 106. The driven member 106 is fixed to the output shaft 70 of the first motor 66 (e.g., by a press-fit, key, snap ring, pin, etc.) such that rotation of the driven member 106 corresponds with rotation of the output shaft 70 and, therefore, with rotation of the string hub 50. The driven member 106 includes a plurality of recesses 110 shaped to receive a corresponding plurality of teeth 114 projecting from an axial surface of the driving member 102. The clutch mechanism 98 includes an externally-threaded tube 122, (referred to herein as a lead screw 122), that is fixed to the output shaft 86 of the second motor 78 by any suitable means (e.g., press-fit, key, snap ring, pin, etc.). The driving member 102 includes internal threads 126 corresponding to the external threads of the lead screw 122 such that relative rotation between the lead screw 122 and the driving member 102 translates the driving member 102 along the axis 54. Translation of the driving member 102 toward a disengaged position of the clutch mechanism 98 is bounded by a shoulder 130 of the second motor 78. Translation of the driving member 102 toward an engaged position of the clutch mechanism 98 is bounded by the driven member 106. The clutch mechanism also includes a washer 134 secured to the output shaft 86 by a retaining ring 138 (e.g., a snap ring). A biasing member 142 is constrained between the washer 134 and the driving member 102 to bias the driving member 102 towards the disengaged position of the clutch mechanism 98.

Figure 4:
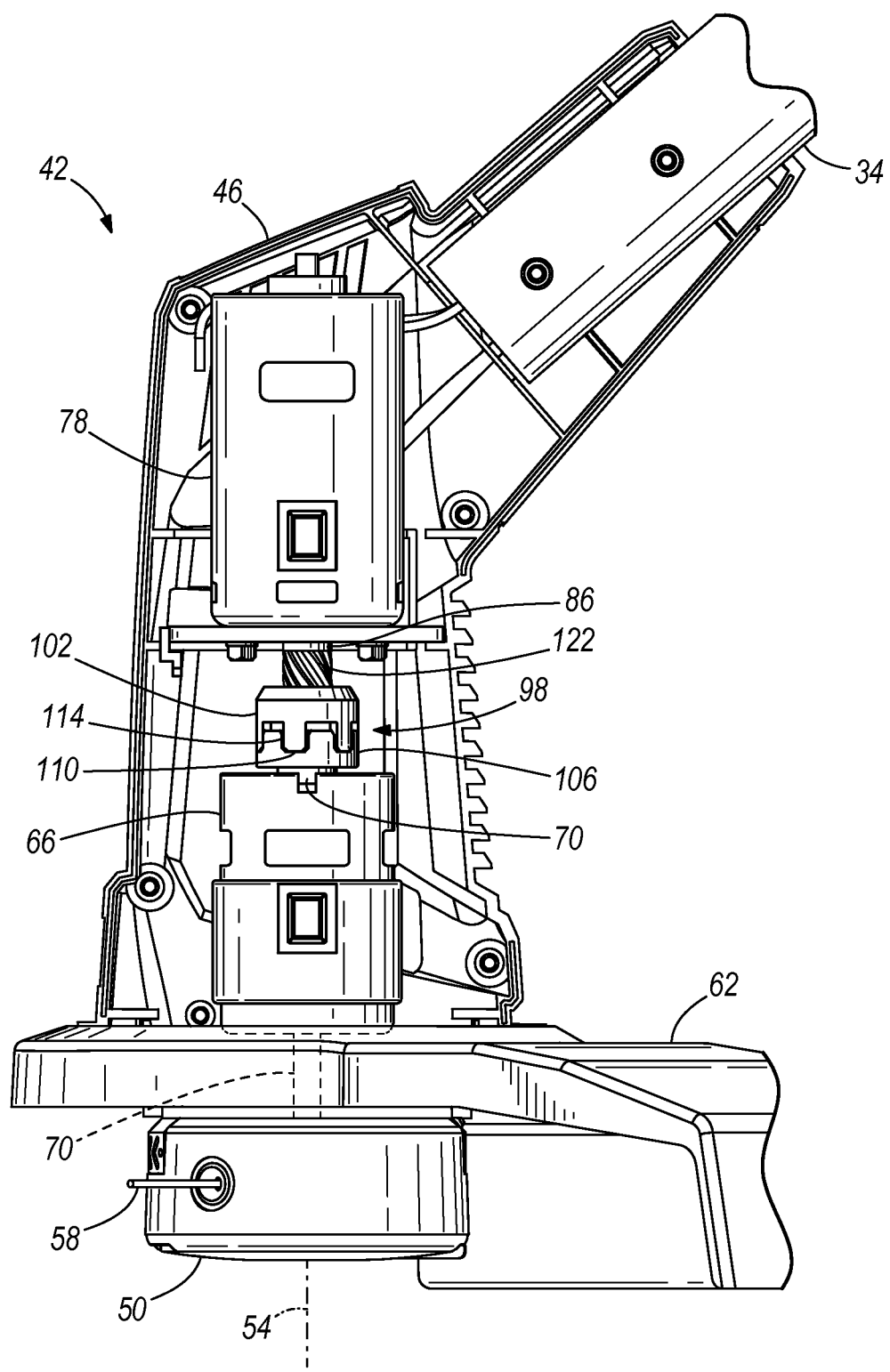
FIG. 4 is a partial, cross-sectional view taken along line 3-3 of FIG. 1, with the clutch mechanism shown in an engaged position.
Figure 5:
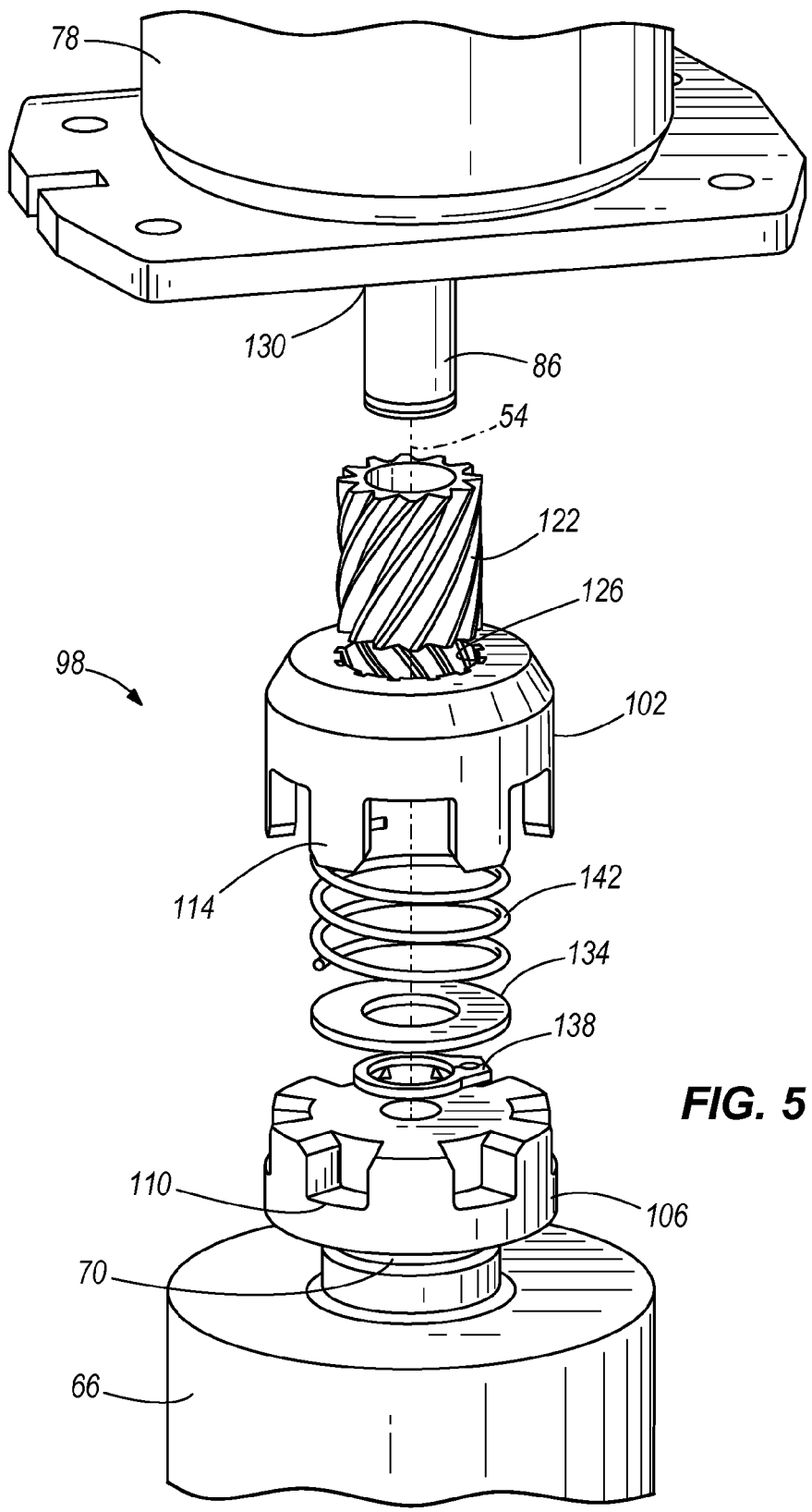
FIG. 5 is an exploded view of the clutch mechanism of FIGS. 3 and 4.

FIGS. 3 and 4 illustrate the disengaged and the engaged positions of the clutch mechanism 98, respectively. In the engaged position of the clutch mechanism 98 (shown in FIG. 4), the teeth 114 are engaged with the recesses 110 to couple the driving member 102 and the driven member 106 for rotation. In the disengaged position of the clutch mechanism 98 (shown in FIG. 3), the driving member 102 is axially spaced from the driven member 106, decoupling the first and second motors 66, 78 such that relative rotation between the driving member 102 and the driven member 106 is permitted.

Figure 6:
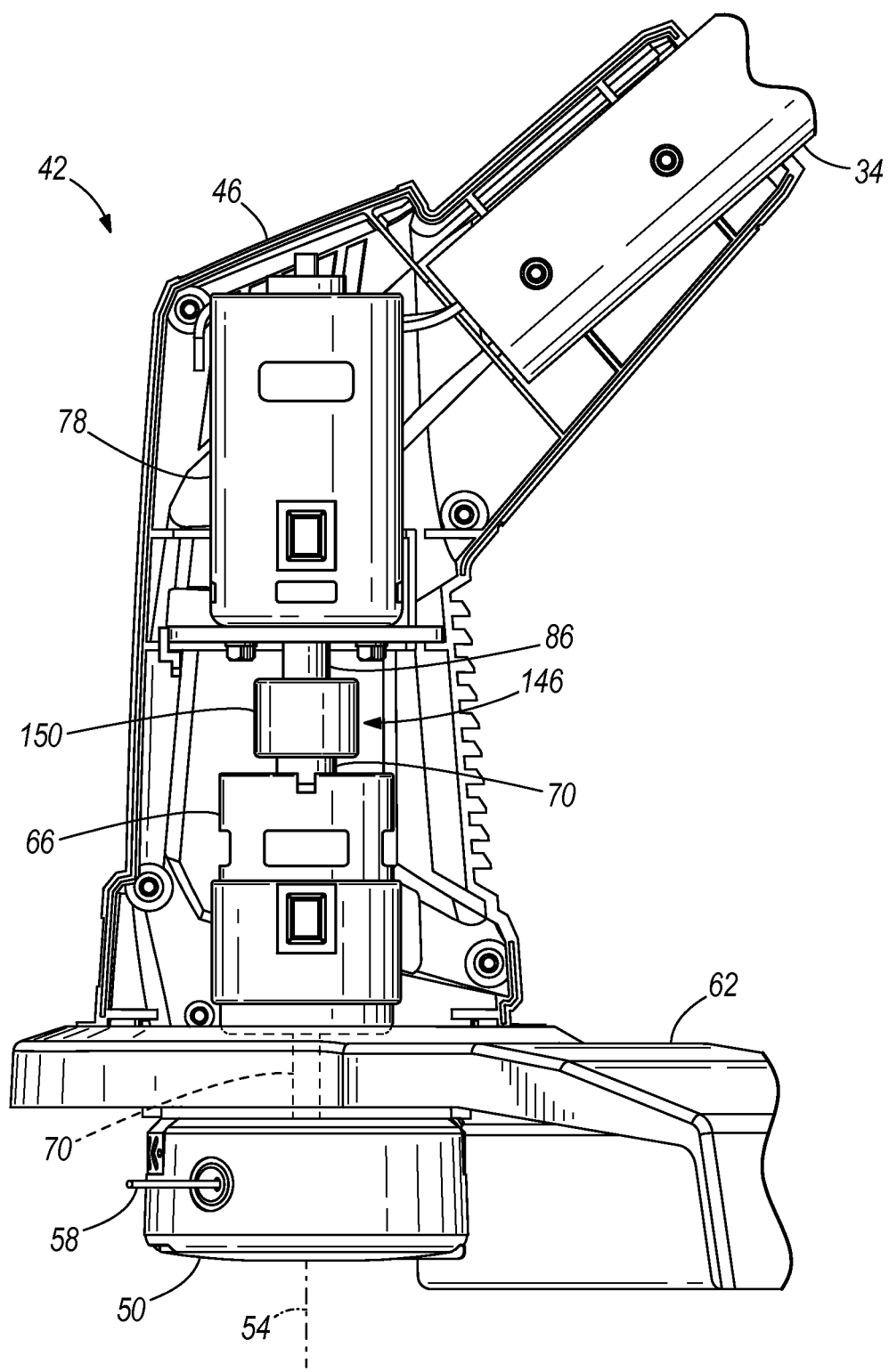
FIG. 6 is a partial, cross-sectional view taken along line 3-3 of FIG. 1, showing an alternative embodiment of the invention.

FIG. 6 illustrates an alternative embodiment of the coupling member 90. In this embodiment, the coupling member 90 takes the form of a one-way bearing 146 (i.e., a roller clutch). The one-way bearing 146 includes an outer race 150 coupled to the output shaft 86 of the second motor 78, and an inner race (not shown) coupled to the output shaft 70 of the first motor 66. The output shafts 70, 86 may be coupled to the one-way bearing 146 in any suitable manner, such as with cooperating splines, a press-fit, a key and keyway, conventional fasteners, and the like. In other embodiments, the outer race 150 may be coupled to the output shaft 70 of the first motor 66, and the inner race may be coupled to the output shaft 86 of the second motor 78.

A plurality of rollers (not shown) is disposed in angled channels (not shown) between the inner race and the outer race 150. The rollers and channels are configured such that the inner race may slip relative to the outer race 150 in a first direction (e.g., clockwise), but the rollers bind the inner race and the outer race 150 in a second direction (e.g., counter-clockwise). The selective slipping/binding of the one-way bearing 146 couples the output shaft 86 of the second motor 78 with the output shaft 70 of the first motor 66 for rotation in the first direction and allows relative rotation between the two output shafts 70, 86 in the second direction.

In operation, a user may desire to operate the string trimmer 10 in the first power mode (i.e., the cordless mode) when no power outlets are conveniently available. The first motor 66 draws DC power from the battery 74 in order to provide torque to the string hub 50 and rotate the cutting element 58 at a sufficient speed to cut down grass or other vegetation. The coupling member 90 permits relative rotation between the output shaft 70 of the first motor 66 and the output shaft 86 of the second motor 78, decoupling the first motor 66 from any resistance associated with the second motor 78 and optimizing battery life.

When the battery 74 becomes depleted or when a power outlet is otherwise available, the user may desire to operate the string trimmer 10 in the second power mode (i.e., the corded mode). The second motor 78 draws power from the AC power source 82, and the coupling member 90 couples the output shaft 86 of the second motor 78 with the output shaft 70 of the first motor 66 for rotation. The second motor 78 provides torque to the string hub 50 through the coupling member 90 and the output shaft 70 of the first motor 66. When driven by the second motor 78, the first motor 66 may act as a DC power supply, to generate power through the battery charging circuit 94 in order to recharge the battery 74.

Figure 7:
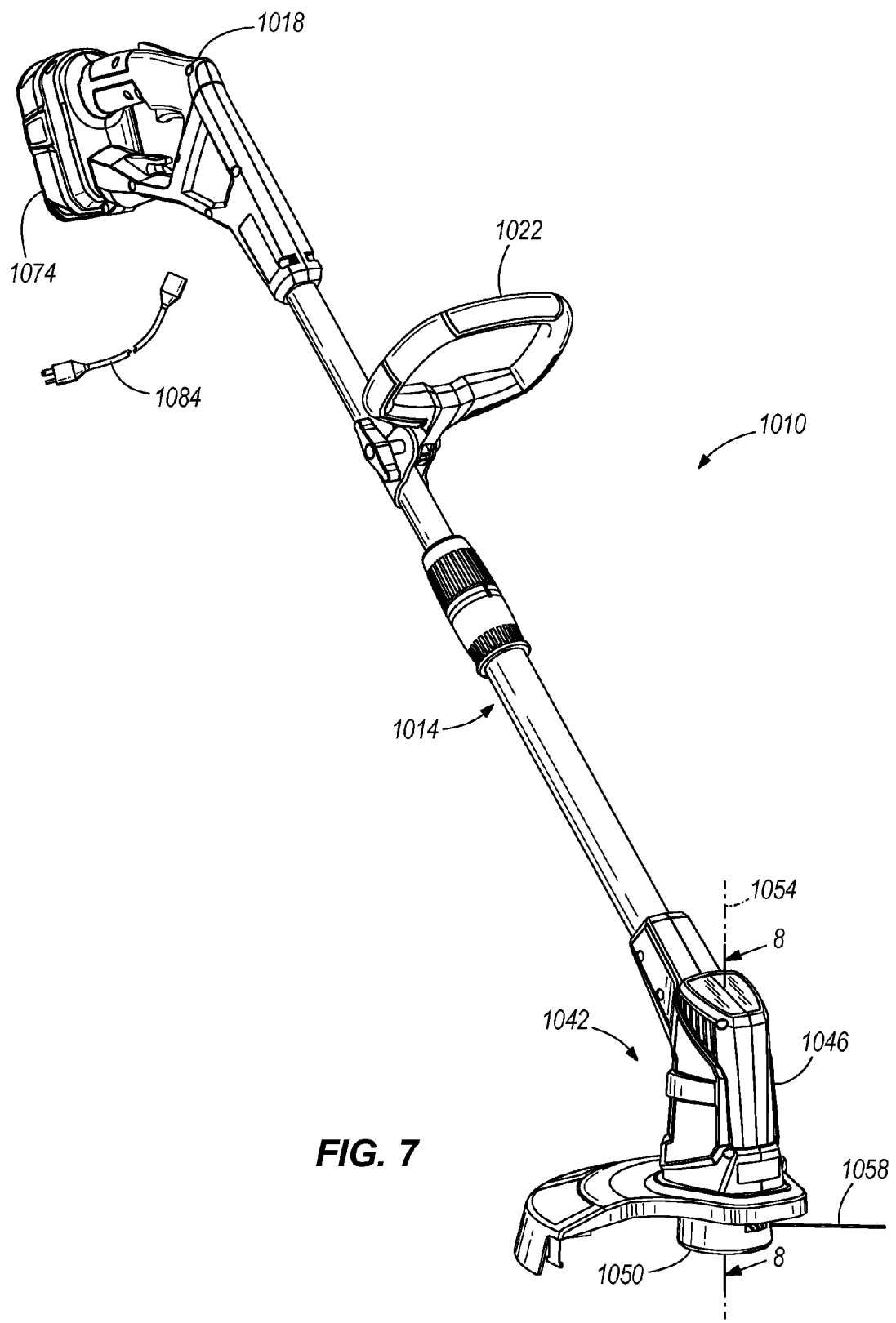
FIG. 7 is a perspective view of a string trimmer according to another embodiment of the invention.

FIG. 7 illustrates a string trimmer 1010 according to another embodiment of the invention. This embodiment employs much of the same structure as the embodiments of the string trimmer 10 described above in connection with FIGS. 1-6. Accordingly, the following description focuses primarily upon the structure and features that are different than the embodiments described above in connection with FIGS. 1-6. Reference should be made to the description above in connection with FIGS. 1-6 for additional information regarding the structure and features, and possible alternatives to the structure and features of the string trimmer 1010 illustrated in FIG. 7 and described below. Structure and features of the embodiment shown in FIG. 7 that correspond to structure and features of the embodiments of FIGS. 1-6 are designated hereinafter in the 1000 series of reference numbers.

The string trimmer 1010 includes a shaft 1014 having a rear handle 1018 at its upper end and a forward handle 1022 spaced from the rear handle 1018 to facilitate two-handed operation of the string trimmer 1010. At its lower end, the string trimmer 1010 includes a head portion 1042 that includes a housing 1046 and a string hub 1050 disposed on the underside of the housing and defining an axis 1054 (FIG. 7). A length of flexible line extends radially outward from the string hub 1050 to form a cutting element 1058.

Figure 8:
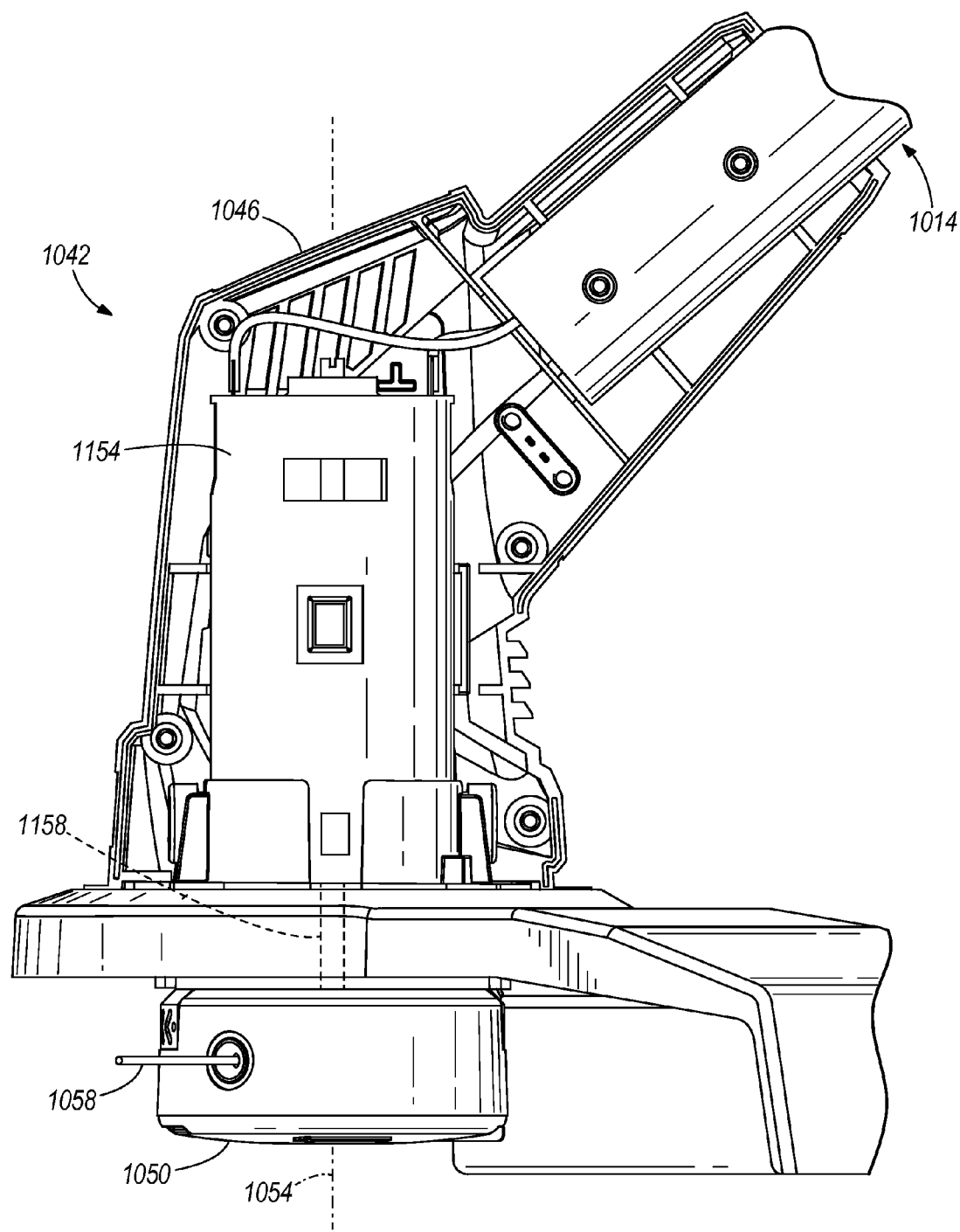
FIG. 8 is a partial, cross-sectional view taken along line 8-8 of FIG. 7.

With reference to FIG. 8, the head portion 1042 includes a motor 1154 supported by the housing 1046 and aligned with the axis 1054 of the string hub 1050. The motor 1154 has an output shaft 1158 that is coupled to the string hub 1050 to transmit torque to the string hub 1050. In the illustrated embodiment, the motor 1154 is configured as a dual-commutator motor, including a DC commutator (not shown) associated with a DC armature (not shown), and a rectified AC commutator (not shown) associated with an AC armature (not shown). Accordingly, the motor 1154 is able to selectively receive power from a rechargeable battery 1074 or from a high-voltage, AC power source 1082, such as a conventional wall outlet. Of course, the string trimmer 1010 could employ the two-motor arrangement of the string trimmer 10 of FIGS. 1-6 if desired. Alternatively, the string trimmer 10 could employ the motor 1154 of the string trimmer 1010 of FIGS. 7-13.

Figure 10:
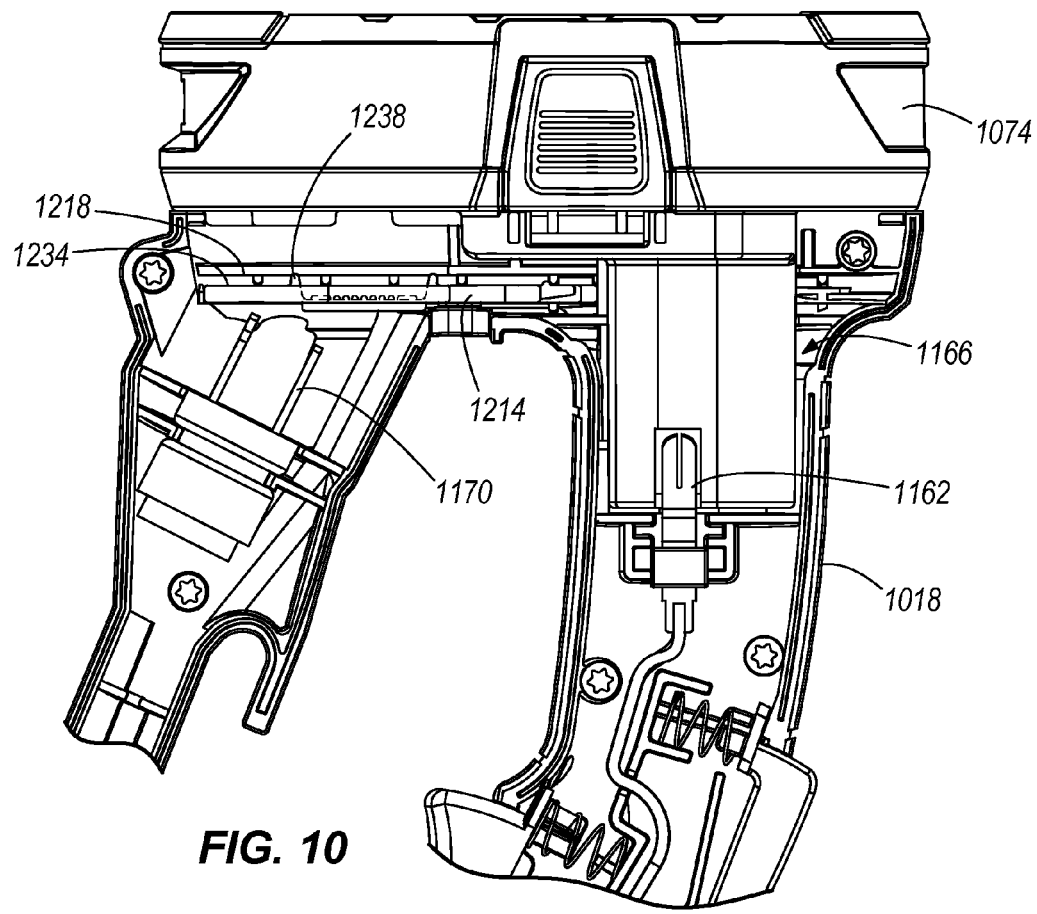
FIG. 10 is a partial, cross-sectional view taken along line 10-10 of FIG. 7, with a mechanical interlock of the string trimmer shown in a first position.

The string trimmer 1010 is capable of operating in a first power mode (i.e., a cordless mode) in which the motor 1154 draws power from the battery 1074. With reference to FIG. 10, the rear handle 1018 of the string trimmer 1010 includes a battery terminal 1162 disposed within a battery receiving portion 1166 of the rear handle 1018. The battery 1074 is electrically connected to the battery terminal 1162 when the string trimmer 1010 is operated in the first power mode. The string trimmer 1010 is also capable of operating in a second power mode (i.e., a corded mode) in which the motor 1154 draws power from the AC power source 1082 through a power cable 1084. The rear handle 1018 includes a receptacle 1170 for receiving the power cable 1084. The power cable 1084 (and the AC power source 1082) is electrically connected to the receptacle when the string trimmer 1010 is operated in the second power mode.

Figure 9:
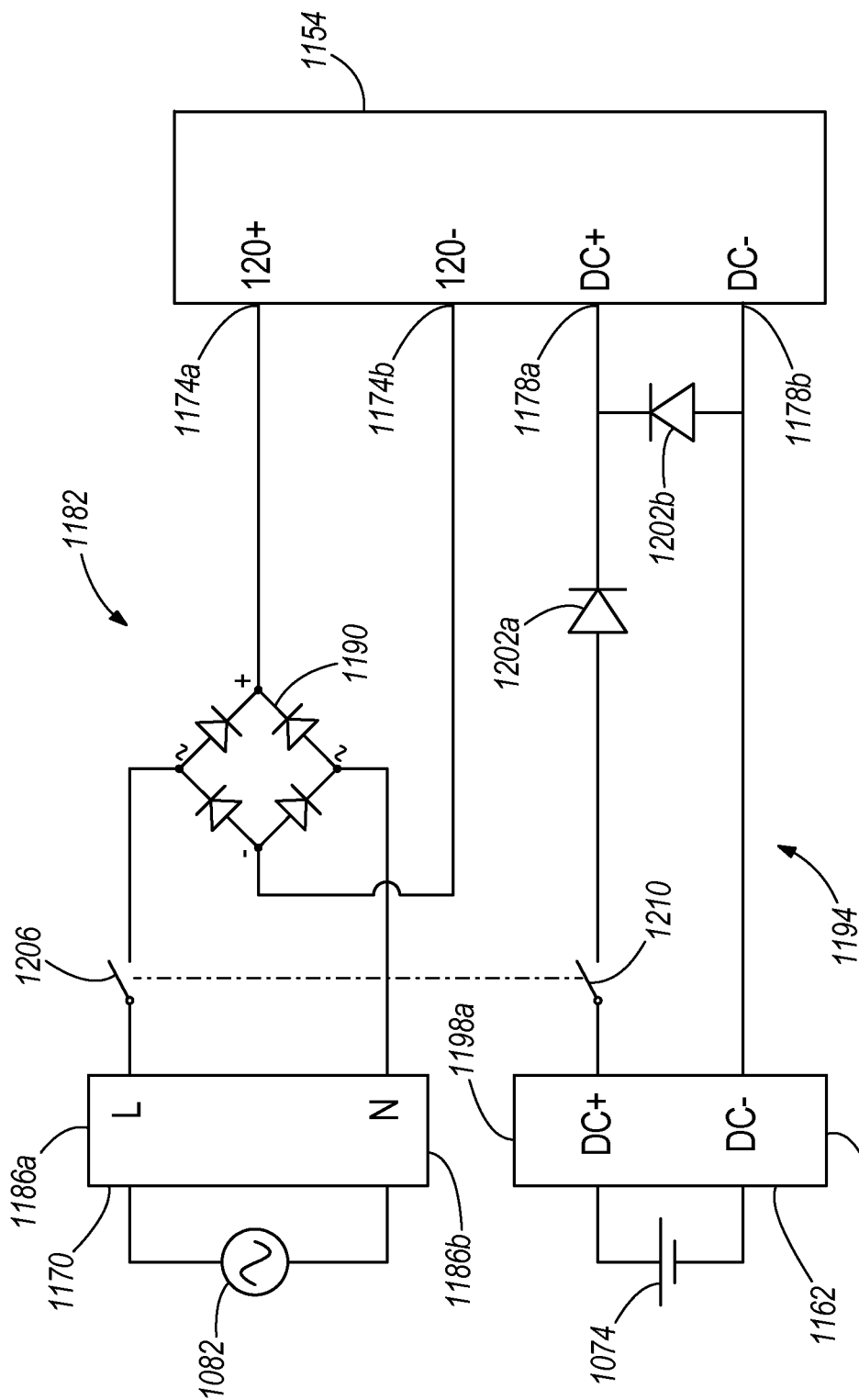
FIG. 9 is a schematic wiring diagram for the string trimmer of FIG. 7.

FIG. 9 illustrates a wiring diagram for the motor 1154. The motor 1154 includes high voltage terminals 1174a, 1174b electrically connected to a first set of brushes (not shown) associated with the rectified AC commutator. The motor 1154 also includes low voltage terminals 1178a, 1178b electrically connected to a second set of brushes (not shown) associated with the DC commutator. A first power circuit 1182 electrically connects live and neutral poles 1186a, 1186b of the receptacle 1170 to the high voltage terminals 1174a, 1174b of the motor 1154 through a full-bridge rectifier 1190. The rectifier 1190 converts AC current supplied by the AC power source 1082 into a DC ripple current. A power conditioner (e.g., a capacitor; not shown) may be included to attenuate the amplitude of the ripple. A second power circuit 1194 electrically connects positive and negative poles 1198a, 1198b of the battery terminal 1162 to the low voltage terminals 1178a, 1178b of the motor 1154. The second power circuit 1194 may include a pair of diodes 1202a, 1202b configured to protect the battery 1074 from any backflow current.

With continued reference to FIG. 9, the first power circuit 1182 includes a first switch 1206 movable between a first position (i.e., a closed position) connecting the live pole 1186a to the power circuit 1182 and a second position (i.e., an open position) disconnecting the live pole 1186a from the power circuit 1182. The first switch 1206 is configured as a normally open switch and moves to the closed position in response to the AC power source 1082 being connected to the receptacle 1170. Similarly, the second power circuit 1194 includes a second switch 1210 movable between a first position (i.e., a closed position) connecting the positive pole 1198*a* to the power circuit 1194 and a second position (i.e., an open position) disconnecting the positive pole 1198*a* from the power circuit 1194. The second switch 1210 is configured as a normally open switch and moves to the closed position in response to the battery 1074 being connected to the battery terminal 1162. The first switch 1206 and the second switch 1210 are synchronized, such that the position of the first switch 1206 corresponds with the position of the second switch 1210. Accordingly, an electrical connection between either the AC power source 1082 and the receptacle 1170 or the battery 1074 and the battery terminal 1162 triggers both the first switch 1206 and the second switch 1210 to move to the closed position. In another arrangement, the switches 1206, 1210 are connected to a trigger or other user actuated mechanism such that power can only be delivered when the user actuates the trigger or other mechanism. In this arrangement, the user's actuation of the trigger or other mechanism closes both switches 1206, 1210 while the release of the trigger opens the switches 1206, 1210.

Figure 12:
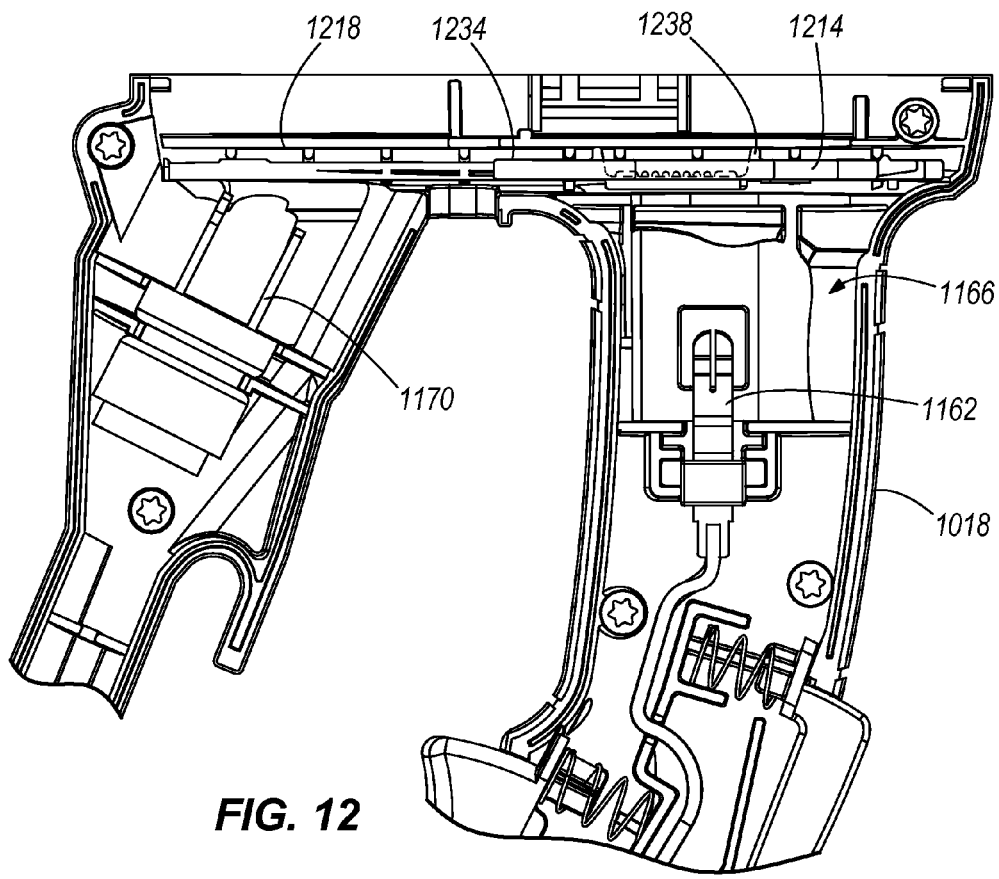
FIG. 12 is a partial, cross-sectional view taken along line 10-10 of FIG. 7, with the mechanical interlock shown in a second position.

With reference to FIGS. 10 and 12, the rear handle 1018 includes a mechanical interlock 1214 movable between a first position (FIG. 10) in which the interlock 1214 physically blocks access to the receptacle 1170 and a second position (FIG. 12) in which the interlock 1214 physically blocks access to the battery terminal 1162. The interlock 1214 allows only one of the battery 1074 and the AC power source 1082 to be connected to the string trimmer 1010 at any given time. Accordingly, the string trimmer 1010 is operable in the cordless mode only when the interlock 1214 is in the first position and in the corded mode only when the interlock 1214 is in the second position. In other embodiments, the interlock 1214 may be configured as an electrical interlock, such as a switch.

Figure 11:
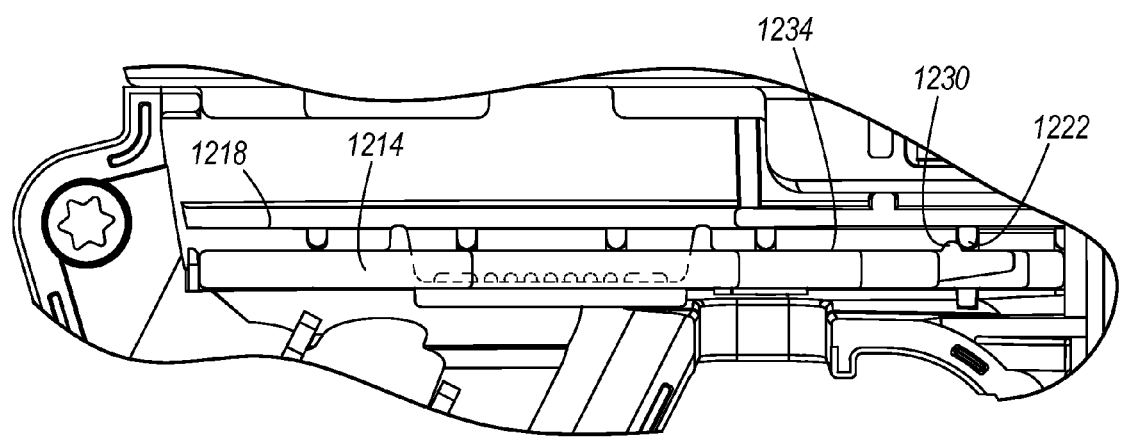
FIG. 11 is an enlarged view of a portion of the mechanical interlock of FIG. 10.
Figure 13:
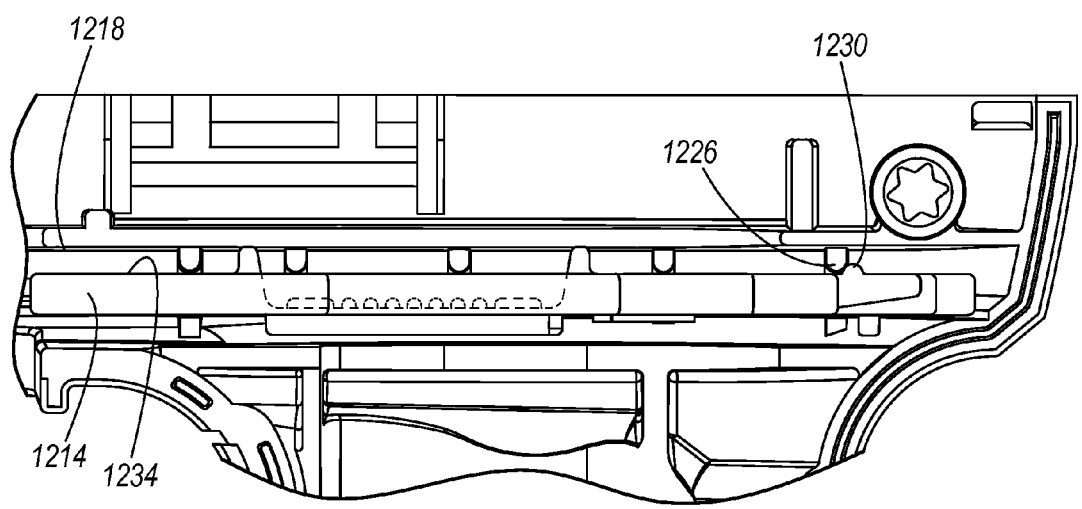
FIG. 13 is an enlarged view of a portion of the mechanical interlock of FIG. 12.

With reference to FIGS. 11 and 13, the interlock 1214 is configured as a generally flat door, slidable within a track 1218 formed in the rear handle 1018. A first detent 1222 (FIG. 11) and a second detent 1226 (FIG. 13) project from the track 1218 in positions corresponding with the first and second positions of the interlock 1214, respectively. A third detent 1230 projects from a surface 1234 of the interlock 1214 and is configured to engage with the first detent 1222 when the interlock 1214 is in the first position and to engage with the second detent 1226 when the interlock 1214 is in the second position. Interference between the third detent 1230 and the first detent 1222 provides tactile feedback that the interlock 1214 has reached the first position and inhibits the interlock 1214 from inadvertently moving out of the first position. Similarly, interference between the third detent 1230 and the second detent 1226 provides tactile feedback that the interlock 1214 has reached the second position and inhibits the interlock 1214 from inadvertently moving out of the second position. In other embodiments, any number or configuration of detents may be used. Still other embodiments may not include any detents.

With reference to FIGS. 10 and 12, a plurality of raised ribs 1238 extends from the surface 1234 of the interlock 1214 to facilitate manipulation of the interlock 1214 between the first and second positions. In other embodiments, a handle, lever, or button may be included to manipulate the interlock 1214 between the first and second positions. In still other embodiments, the interlock 1214 may be automatically movable between the first and second positions in response to insertion or removal of the battery 1074 and/or the power cord 1084.

In operation, a user may desire to operate the string trimmer 1010 in the first power mode (i.e., the cordless mode) when no power outlets are conveniently available. The user first positions the mechanical interlock 1214 in the first position to permit an electrical connection between the battery 1074 and the battery terminal 1162. In response to the electrical connection between the battery 1074 and the battery terminal 1162, the first and second switches 1206, 1210 move to the closed position, electrically connecting the battery 1074 to the motor 1154. The motor 1154 draws DC power from the battery 1074 in order to provide torque to the string hub 1050 and rotate the cutting element 1058 at a sufficient speed to cut down grass or other vegetation.

When the battery 1074 becomes depleted or when a power outlet is otherwise available, the user may desire to operate the string trimmer 1010 in the second power mode (i.e., the corded mode). The user disconnects the battery 1074 from the string trimmer 1010, and the first and second switches 1206, 1210 move to the open position. The user then positions the mechanical interlock 1214 in the second position to permit access to the receptacle 1170. Next, the user plugs the power cable 1084 into the receptacle 1170 to provide an electrical connection between the AC power source 1082 and the receptacle 1170. The first and second switches 1206, 1210 move to the closed position, electrically connecting the AC power source 1082 to the motor 1154. The motor 1154 draws power from the AC power source 1082 in order to provide torque to the string hub 1050 and rotate the cutting element 1058 at a sufficient speed to cut down grass or other vegetation.

It is understood that the features of the string trimmers 10 and 1010 described herein are equally applicable to other types of power tools and electric appliances, such as drills, saws, routers, sanders, blowers, vacuums, portable lights, and the like. In addition, aspects of the string trimmers 10, 1010 described with regard to one of the string trimmers 10, 1010 are equally applicable to the other string trimmer 10, 1010.

Various features of the invention are set forth in the following claims.

What is claimed is:

1. A power tool comprising:
   a housing;
   an output shaft supported by the housing for rotation about an axis;
   a battery terminal selectively operable to receive a DC power supply from a battery;
   a receptacle arranged to selectively engage and disengage an AC power source external to the power tool, the receptacle operable to receive an AC power supply from the AC power source when the AC power source is engaged with the receptacle;
   a motor operable in a first power mode in response to receipt of the DC power supply to rotatably drive the output shaft and operable in a second power mode in response to receipt of the AC power supply to rotatably drive the output shaft; and
   a mechanical interlock movable between a first position in which the interlock physically blocks an electrical connection between the receptacle and the AC power source to inhibits a flow of the AC power supply to the receptacle and a second position in which the interlock physically blocks an electrical connection between the battery terminal and the battery to inhibits a flow of the DC power supply to the battery terminal.

2. The power tool of claim 1, further comprising a circuit including a first switch disposed between the battery terminal and the motor and a second switch disposed between the receptacle and the motor.

3. The power tool of claim 2, wherein the first switch and the second switch are movable from an open circuit position to a closed circuit position in response to an electrical connection between the battery terminal and the battery and in response to an electrical connection the receptacle and the AC power source.

4. The power tool of claim 1, wherein the motor is a dual-commutator motor.

5. The power tool of claim 1, further comprising a string trimming member coupled to the output shaft for rotation.

6. The power tool of claim 1, further comprising a handle assembly configured to be gripped by a user during operation of the power tool, wherein the battery terminal and the receptacle are located on the handle assembly.

7. The power tool of claim 6, wherein the mechanical interlock is configured as a door, the door being slidable relative to the handle assembly between the first position and the second position.

8. The power tool of claim 7, wherein the handle assembly includes a track, and wherein the door is slidable along the track between the first position and the second position.

9. The power tool of claim 1, wherein the mechanical interlock includes a plurality of ribs to facilitate moving the mechanical interlock between the first position and the second position.

10. A power tool comprising:
a housing;
an output shaft supported by the housing for rotation about an axis;
a battery terminal selectively operable to receive a DC power supply from a battery;
a receptacle arranged to selectively engage and disengage an AC power source external to the power tool, the receptacle operable to receive an AC power supply from the AC power source when the AC power source is engaged with the receptacle;
a motor operable in a first power mode in response to receipt of the DC power supply to rotatably drive the output shaft and operable in a second power mode in response to receipt of the AC power supply to rotatably drive the output shaft; and
a mechanical interlock movable between a first position in which the interlock inhibits a flow of the AC power supply to the receptacle and a second position in which the interlock inhibits a flow of the DC power supply to the battery terminal,
wherein the mechanical interlock physically blocks the receptacle to prevents a mechanical and an electrical connection of the AC power source to the power tool when in the first position and physically blocks the battery terminal to prevents a mechanical and an electrical connection of the battery to the power tool when in the second position.

11. The power tool of claim 10, further comprising a handle assembly configured to be gripped by a user during operation of the power tool, wherein the battery terminal and the receptacle are located on the handle assembly.

12. The power tool of claim 11, wherein the mechanical interlock is configured as a door, the door being slidable relative to the handle assembly between the first position and the second position.

13. The power tool of claim 12, wherein the handle assembly includes a track, and wherein the door is slidable along the track between the first position and the second position.

14. The power tool of claim 10, wherein the mechanical interlock includes a plurality of ribs to facilitate moving the mechanical interlock between the first position and the second position.

* * * * *